Oct. 4, 1927.
W. JONES
1,644,061
AUTOMATIC REVERSE MOTION BRAKE
Filed June 6 1925
2 Sheets-Sheet 1
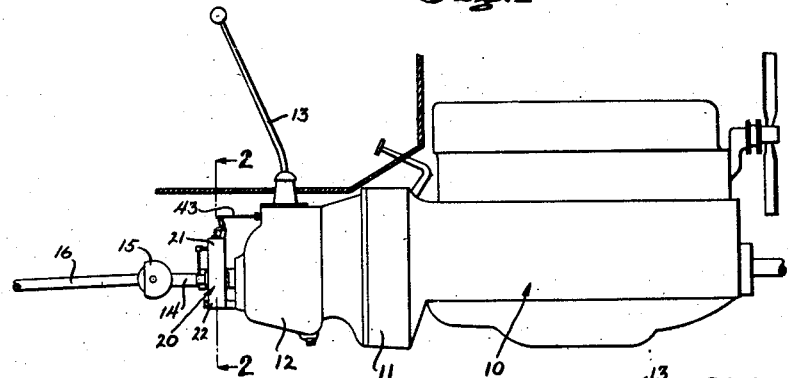
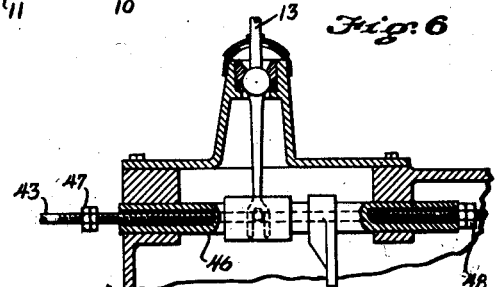
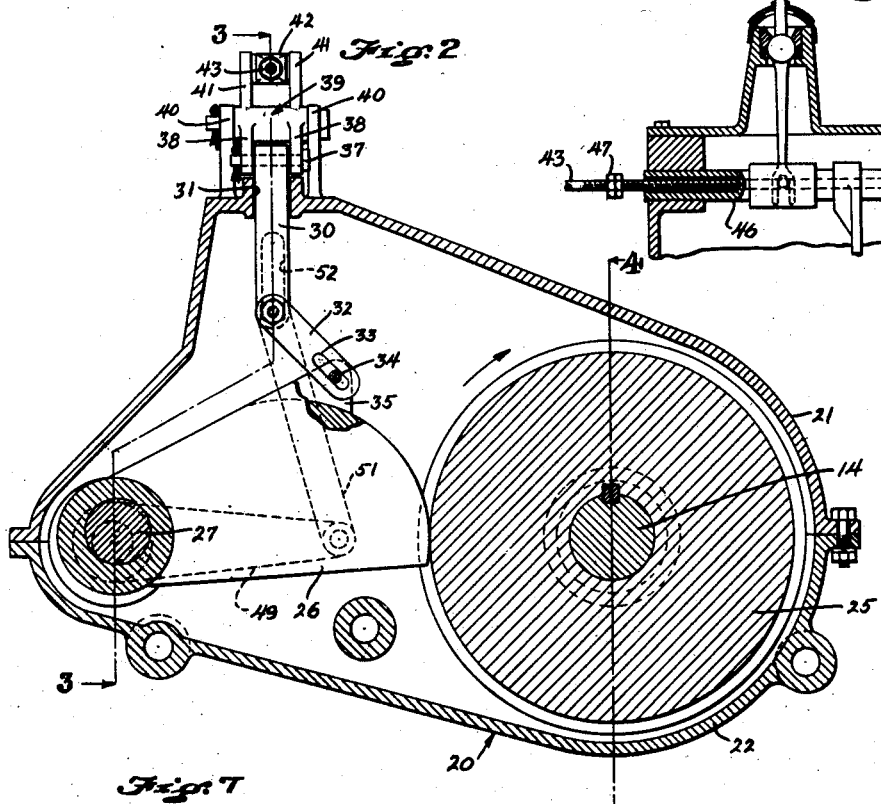
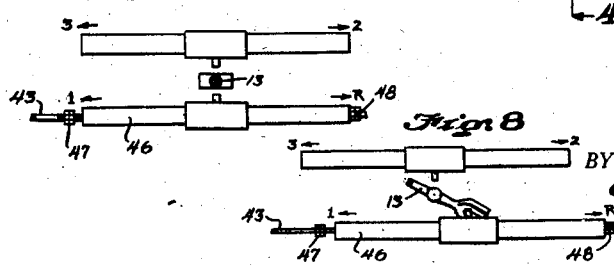
INVENTOR.
WILLIAM JONES
BY Edward A. Stevens
ATTORNEY.

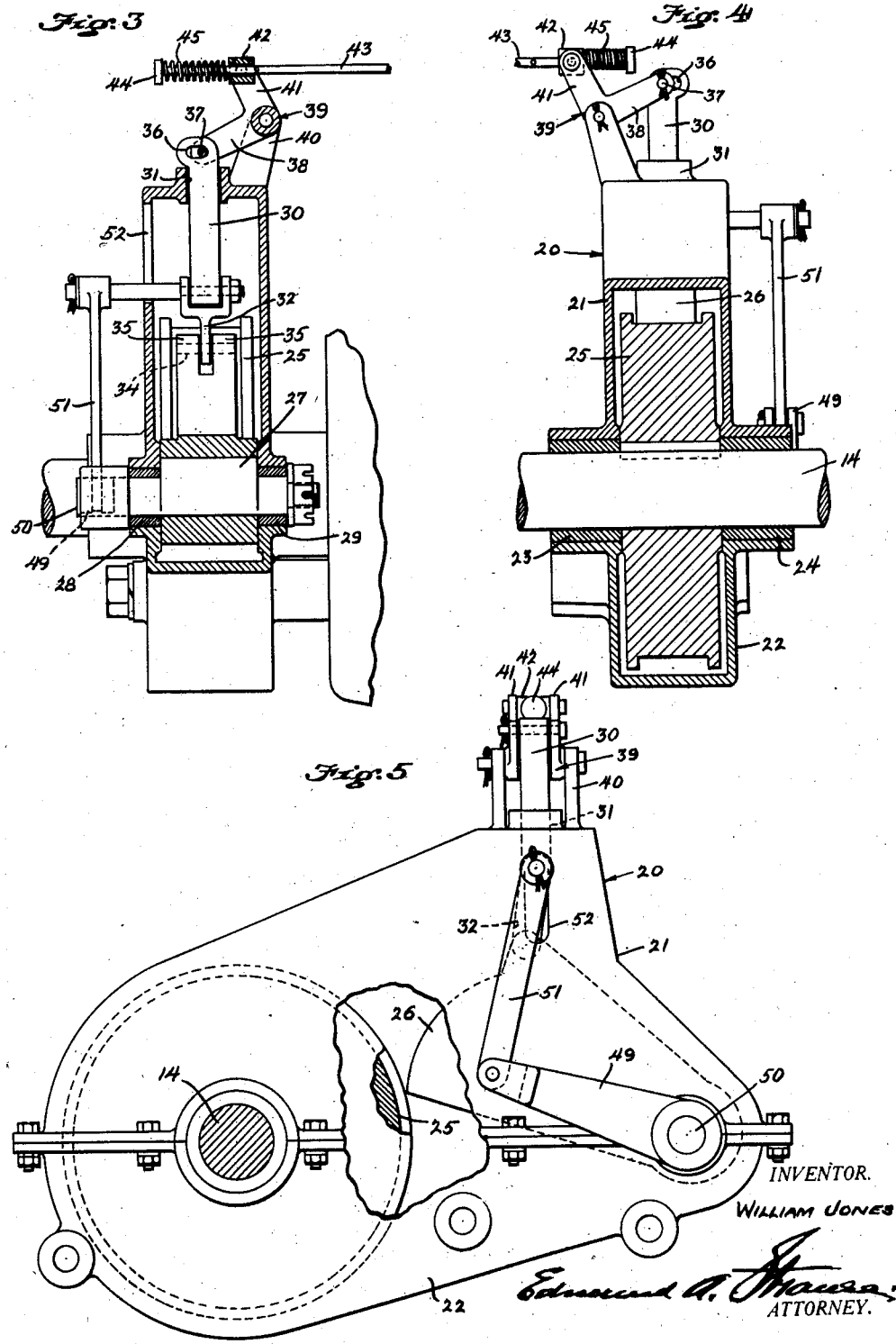

Patented Oct. 4, 1927.

1,644,061

UNITED STATES PATENT OFFICE.

WILLIAM JONES, OF LOS ANGELES, CALIFORNIA.

AUTOMATIC REVERSE-MOTION BRAKE.

Application filed June 6, 1925. Serial No. 35,416.

This invention has relation to a safety brake device particularly designed for use in connection with auto-vehicles.

An important object of this invention is to provide a simple device that may be readily applied to an auto-vehicle to prevent an accidental reverse movement when changing gears, or on a stoppage of the vehicle.

A further object is to provide a device in which the braking mechanism may be automatically and instantly forced into inoperative position on a reverse shifting movement of the transmission gears.

A still further object is to provide a device that may be readily applied to auto-vehicle propelling and braking mechanisms without effecting a mechanical change.

Briefly, an embodiment of the invention as shown is connected to the propeller shaft of an auto-vehicle, but it will be understood that it may be as readily and effectively applied to a vehicle's braking drums, wheels, or axle shafts. As here shown the device consists of a metal housing bolted or otherwise secured to the rear end of a transmission casing, the propeller shaft passing through suitable bearings formed in the housing walls. Keyed to the propeller shaft within the housing is a flanged collar, and loosely mounted on a cam member disposed in bearings formed in the side walls of said housing is a braking dog adapted to normally engage by gravity the peripheral surface of the collar to prevent a reverse motion of the propeller shaft when changing from one forward gear to another, and to lock the car against reverse movement when the vehicle is not in operation.

Suitable toggle mechanism connected to the cam member of the braking dog, and to one of the transmission shifting rods is provided for instantly forcing the dog out of locked engagement with the collar when it is desired to propel the vehicle in reverse gear.

In the drawings wherein certain embodiments of the invention are disclosed by way of example:

Fig. 1 is a side elevation of an automobile engine of usual type showing the brake device applied thereto.

Fig. 2 is an enlarged longitudinal section through the brake device in a locked position taken on line 2—2 of Fig. 1.

Fig. 3 is a transverse section of the brake taken on line 3—3 of Fig. 2.

Fig. 4 is a similar view taken on line 4—4 of Fig. 2 with the brake in an unlocked position.

Fig. 5 is a side elevation of the brake in an unlocked position, parts of the casing being broken away to more clearly disclose the mechanism therein.

Fig. 6 is a sectional view of the upper portion of a transmission mechanism showing the gear shifting lever and its connection to the shifting rod for actuating the brake device.

Fig. 7 is a diagrammatic plan view of the shifting rods of a transmission mechanism showing the brake operating rod connected to the first and reverse shifting rod, the same being in "neutral".

Fig. 8 is a similar view showing the first and reverse shifting rod in "reverse" position with brake device in an unlocked position as shown in Fig. 5.

Referring now to the drawing, 10 indicates an internal combustion engine of the form usually employed in connection with motor vehicles, 11 the clutch casing, and 12 the transmission case to which is connected the usual gear shifting lever 13. The shaft 14 extending from the rear of the transmission case is connected through the universal 15 to the vehicle propeller shaft 16, all the above mechanisms being of usual form and as they form no part of my invention no specific description is thought to be necessary to a complete understanding of the present invention.

The auxiliary braking mechanism 20, preferably consists of a housing formed of upper and lower sections 21, 22, respectively, bolted or otherwise suitably secured together. Housing 20 is secured to the rear end of the transmission case by means of bolts passing through the lower housing section with the shaft 14 extending through suitable bearings 23, 24, formed in the side walls of the housing. Keyed to the shaft 14 within the housing is a flanged collar 25, whose periphery is normally engaged by the curved outer end of a brake dog 26 that is pivotally mounted on a cam shaft member 27, said cam being rotatively mounted in bushed bearings 28, 29 of the housing.

Brake dog 26, as heretofore noted, is at all times normally in contact with the brake collar 25 and when the propeller shaft is rotating to drive the vehicle forwardly, as shown by the arrow in Fig. 2, no braking action will occur as the rotating collar will tend to lift the dog out of engagement, but the moment a reverse motion of the shaft 14 occurs, as when changing from one set of forward motion gears to another, and especially when ascending grades, the dog will instantly engage the collar and lock the shaft against further rotation.

In order to permit of a reverse movement of the vehicle, as when backing, means must be provided to render the brake dog 26 inoperative, and to this end a toggle mechanism connected to one of the transmission reverse gear shifting rods, and to the brake device is employed, the said mechanism being operated automatically on a reverse shifting movement of the gear shifting rod. This toggle mechanism preferably consists of a plunger rod 30 mounted in a bearing 31 formed in the top wall of section 21 of the housing, its lower end being pivotally connected to a yoked link 32, whose free end is provided with a slot 33 through which passes a pin 34 rigidly secured in ears 35 formed on the upper edge of the brake dog, the slot 33 permitting of a free upward swinging movement of the dog on a forward rotation of the propeller shaft. The upper end of plunger shaft 30 is also transversely slotted as at 36, a pin 37 secured to the lower arms 38 of a bell crank lever 39 mounted in bearings 40 formed on the housing passing therethrough, the slot permitting of a vertical reciprocation of the plunger rod on an operation of the mechanism. Pivoted between the upper arms 41 of the lever 39 is an apertured block 42, the free end of an operating rod 43 passing therethrough, said rod being provided with a nut 44, a coiled spring 45 being interposed on the rod between the nut and pivoted block to permit at all times of a positive locking engagement of the brake dog with the collar. The inner end of the operating rod passes through the bore of the "reverse" transmission shifting rod 46, adjusting nut 47, mounted on the operating rod providing a means for maintaining the dog in an inoperative position when it is desired to manually back the vehicle, as will be more fully explained hereinafter.

In order that the pivoted brake dog may be instantly thrown out of contact with, or disengaged from the collar 25 on a reverse gear shifting movement, a link mechanism is employed in connection with the toggle mechanism of the device. By means of this mechanism the brake dog will first be forced out of engagement with the collar 25 through the medium of the cam member 27, and on a further upward movement of the plunger the brake will be raised upwardly into an inoperative position as shown in Fig. 5. The link mechanism above referred to preferably consists of a crank arm 49 rigidly secured to the projecting end 50 of the cam member. Pivotally secured to the outer end of arm 49 is a link 51, its free end being pivotally connected to the lower end of the plunger arm 30 through a vertically disposed slot 52 formed in the adjacent housing wall.

From the above description it is thought that the operation of the brake device will be clearly apparent. The cam member on which the brake dog is mounted will at all times normally force the curved edge of the dog into braking engagement with the peripheral surface of the flanged collar, but as the dog is loosely mounted on the cam member it will be apparent that when the vehicle is being operated forwardly and the collar rotating away from the dog no binding or wedging action will occur. When it is desired to propel the vehicle rearwardly the movement of the gear shifting rod 46 to "reverse" will automatically rotate the cam member through the medium of the crank arm 48 and link 51 to relieve the pressure of the braking dog against the collar 25, the toggle mechanism simultaneously swinging the dog upwardly on its pivot and clear of the rotating collar, this operation permitting of a free rotation of the propeller shaft in a reverse direction.

When the vehicle is not in operation and it is desired to move the same rearwardly without starting the engine, the gear shifting rod 46 is thrown into reverse to disengage the dog from the collar on the propeller shaft. As the adjusting nut 47 is spaced a suitable distance from the adjacent end of the gear shift rod 46, the gears may then be shifted to "neutral" without effecting a locking movement of the dog, thus permitting a rearward movement of the vehicle without interference. When the vehicle has been moved the desired distance the shifting rod is again thrown into "first" to lock the brake and then back into "neutral."

The diagrammatic views shown in Figs. 7, 8, are intended to illustrate the pair of gear shifting rods common to various types of transmission mechanism, the braking device operating rod being shown in connection with the shifter rod that moves the gears into "first" or "reverse".

The numerous advantages of my braking device will be clearly discernible from the foregoing description, the device facilitating the driving of a vehicle in congested traffic, and as the device is always in locking position during a forward movement of the vehicle, a driver may readily change gears while ascending grades without the necessity of using the vehicle hand or foot brakes.

What I claim is:

1. In combination with an auto-vehicle provided with a rotary propulsion means and a gear changing mechanism, of a collar fast to said propulsion means, a cam member mounted in bearings, a locking dog mounted on said cam member its free end being normally in contact with the peripheral surface of said collar, and means to rotate the cam member to move the locking dog into an inoperative position with respect to said collar on a reverse gear shifting movement.

2. The combination of a propeller shaft, a collar fast thereto, a braking dog normally adapted to engage said collar to prevent reverse rotation of the propeller shaft, a cam mounted for rotation, a braking dog mounted on said cam, said cam adapted to move said braking dog out of engagement with said collar to permit a reverse movement of the propeller shaft.

3. The combination with an auto-vehicle propeller shaft, means for rotating the same, and a gear shifting mechanism for reversing the direction of rotation of the propeller shaft, of a collar fast on said shaft, a cam member, a braking dog mounted on said cam member, its free end being normally in contact with said collar to prevent reverse rotation of said shaft when changing from one forward gear to another and to lock the shaft from reverse movement when the propeller shaft is not in operation, and a toggle means for automatically rendering the braking dog inoperative when the reverse gears are brought into operation.

4. The combination with an auto-vehicle rotary driving member and means for rotating the same and a gear shifting mechanism for reversing the direction of rotation of said driving mechanism, of a collar fast to the rotary driving member, a cam member mounted for rotation, a braking dog mounted on said cam member, the free end of said dog normally engaging the peripheral surface of said collar, whereby to prevent a reverse rotation of the driving member, and means connected to said cam member and the gear shifting mechanism for rotating the cam member to move the dog out of engagement with the collar on a reverse shifting movement of the gear shifting mechanism.

5. In combination with a propeller shaft provided with a collar concentrically secured thereto and gear shifting means for controlling the reverse movement of the propeller shaft, of a gravity operated pivoted braking dog positioned in engageable relation to said collar, whereby reverse movement of the propeller shaft is inhibited, and means controlled by the reverse gear shift mechanism for positively moving the braking dog out of engagement with the collar and simultaneously swinging the dog on its pivot when it is desired to rotate the propeller shaft in a reverse direction.

6. A device for normally locking a propeller shaft against reverse movement comprising a collar rigidly secured in concentric relation to the propeller shaft, a cam actuated braking dog having a curved outer end normally engaging the collar to prevent reverse movement of the propeller shaft, a toggle mechanism connected to said braking dog, and means connected to the cam and to the toggle mechanism for operating the same to move the dog into an inoperative position when it is desired to reverse the direction of rotation of the propeller shaft.

7. An automobile back stop device comprising a rotary driving shaft having a collar secured in concentric relation thereon, a braking dog normally engaging said collar to prevent reverse motion of said driving shaft, a cam for disengaging the dog from the collar when it is desired to reverse the direction of shaft rotation, and a toggle mechanism for actuating said cam.

In testimony whereof I have signed to this specification.

WILLIAM JONES.